(12) United States Patent
Shen et al.

(10) Patent No.: US 7,450,556 B2
(45) Date of Patent: Nov. 11, 2008

(54) METHOD AND APPARATUS ESTIMATING CELL INTERFERENCE AND NOISE FOR CDMA PACKET DATA CHANNELS

(75) Inventors: Qiang Shen, San Diego, CA (US); Stanislaw Czaja, Cardiff, CA (US)

(73) Assignee: VIA Telecom Co., Ltd. (KY)

(*) Notice: Subject to any disclaimer, the term of this patent is extended or adjusted under 35 U.S.C. 154(b) by 1029 days.

(21) Appl. No.: 10/618,079

(22) Filed: Jul. 10, 2003

(65) Prior Publication Data
US 2005/0007975 A1    Jan. 13, 2005

(51) Int. Cl.
*H04B 7/216*    (2006.01)
(52) U.S. Cl. .................... 370/342; 370/320; 370/335; 375/147; 375/148
(58) Field of Classification Search ............... 455/442, 455/506; 370/491, 206, 506, 342, 320, 335, 370/341, 208; 375/130, 219, 147, 148, 150, 375/227
See application file for complete search history.

(56) References Cited

U.S. PATENT DOCUMENTS

| | | | | |
|---|---|---|---|---|
| 5,978,413 | A * | 11/1999 | Bender | 375/149 |
| 6,496,531 | B1 * | 12/2002 | Kamel et al. | 375/130 |
| 6,504,830 | B1 | 1/2003 | Östberg et al. | 370/342 |
| 6,515,980 | B1 | 2/2003 | Bottomley | 370/342 |
| 6,683,903 | B1 * | 1/2004 | Wang | 375/130 |
| 6,717,976 | B1 * | 4/2004 | Shen | 375/147 |
| 2003/0099258 | A1 * | 5/2003 | Calcev et al. | 370/479 |
| 2004/0131030 | A1 * | 7/2004 | Kuroyanagi et al. | 370/335 |

* cited by examiner

*Primary Examiner*—George Eng
*Assistant Examiner*—Brandon J Miller
(74) *Attorney, Agent, or Firm*—Jaquez & Associates; Martin J. Jaquez, Esq.; William C. Boling, Esq.

(57) ABSTRACT

A method and apparatus for communicating data signals using a spread spectrum cellular network, the cellular network including a plurality of base stations coupled to the cellular network the mobile unit assigned to one of the plurality of base stations. The method and apparatus receives a signal of another of the plurality of base stations (target base station) and determines the interference density to the target base station from the received signal.

48 Claims, 6 Drawing Sheets

METHOD AND APPARATUS ESTIMATING CELL INTERFERENCE AND NOISE FOR CDMA PACKET DATA CHANNELS

BACKGROUND

1. Field of the Invention

The invention relates generally to spread spectrum mobile communication networks, and more particularly, to a method and apparatus for estimating cell interference in a spread spectrum mobile cellular communication network.

2. Description of Related Art

In spread spectrum mobile cellular communication networks, the signal power level between base stations and mobile units is carefully controlled. For example in code division multiple access ("CDMA") mobile communication system versions, a mobile unit calculates the channel quality of a signal transmitted from the base station and periodically reports this measured channel quality to the base station. The base station may then adjust the gain of future transmissions to the reporting mobile unit accordingly. In addition, the mobile unit may determine and report the channel quality of pilot signals received from other base stations. Depending on the reported channel quality of other pilot signals, communication between the mobile unit and another base station may be established.

In CDMA IS2000 standards prior to release C (1xEVDV), the channel quality for a pilot signal of a nearby base station is defined as the ratio of the pilot signal energy to the total noise and interference power as experienced by the mobile unit. In the CDMA IS2000 standard release C (1xEVDV), the channel quality ("C/I") of a pilot signal of a nearby base station is defined as the ratio of the pilot power to the interference density ($N_t$), where $N_t$ is the noise level experienced by the mobile unit when the received signal is despread using a target cell P/N sequence, excluding all same cell orthogonal signals of the target cell. A mobile unit linked to a base station operating in a CDMA IS2000 release C standard based cellular network must periodically determine the defined C/I for nearby base stations. The mobile unit may be required to determine the C/I for nearby base stations while conducting a call with its current base station and thus has limited resources to determine the defined C/I. A need thus exists for a mobile unit based system and method that may be employed to efficiently determine $N_t$ and C/I (as defined by the CDMA IS2000 standard release C) for nearby base stations. The present invention provides such a mobile unit based system and method.

SUMMARY OF THE INVENTION

The present invention includes a system, mobile unit, method, and article of manufacture for communicating data signals using a spread spectrum cellular network. The cellular network includes a plurality of base stations coupled to the cellular network and a mobile unit is assigned to one of the plurality of base stations (active base station). The system receives a signal of another of the plurality of base stations (target base station) and determines the interference density to the target base station from the received signal. The system may synchronize an Orthogonal code sequence with the Orthogonal code sequence boundary of the target base station's pilot sequence.

In an embodiment, the system may correlate the received signal with a corresponding P/N sequence of the target base station, correlate the selected Orthogonal code sequence with the P/N correlated target pilot sequence of the target base station, and determine the energy of the Orthogonally correlated, P/N correlated, target pilot sequence. In the embodiment the Orthogonal code sequence may be a Walsh code sequence. Further, the cellular network may be a CDMA based network and each base station of the plurality of base stations represents a network cell.

In an embodiment, the system may select a code sequence that is at least quasi-orthogonal to the Orthogonal code sequences currently employed by the target base station where the selected code sequence is comprised of a repetition of a code sequence that is orthogonal to other code sequences currently employed by the target base station and the length of the selected code sequence is an integer multiple of the longest Orthogonal code sequences currently employed by the target base station. Further, the system may synchronize the selected code sequence by determining the Orthogonal code sequence boundary for the active base station's pilot signal and determining the Orthogonal code sequence boundary for the target base station's pilot signal from the determined active base station's pilot signal Orthogonal code sequence boundary.

In another embodiment, the system may correlate the received signal with a corresponding P/N sequence of the target base station and correlate a pilot Orthogonal code sequence with the target base station's P/N correlated signal. The system may further determine the power of the target base station's P/N correlated signal and determine the energy of the Orthogonally correlated, P/N correlated, received signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Throughout this description, embodiments and variations are described for the purpose of illustrating uses and implementations of the invention. The illustrative description should be understood as presenting examples of the invention, rather than as limiting the scope of the invention.

Figure 1:
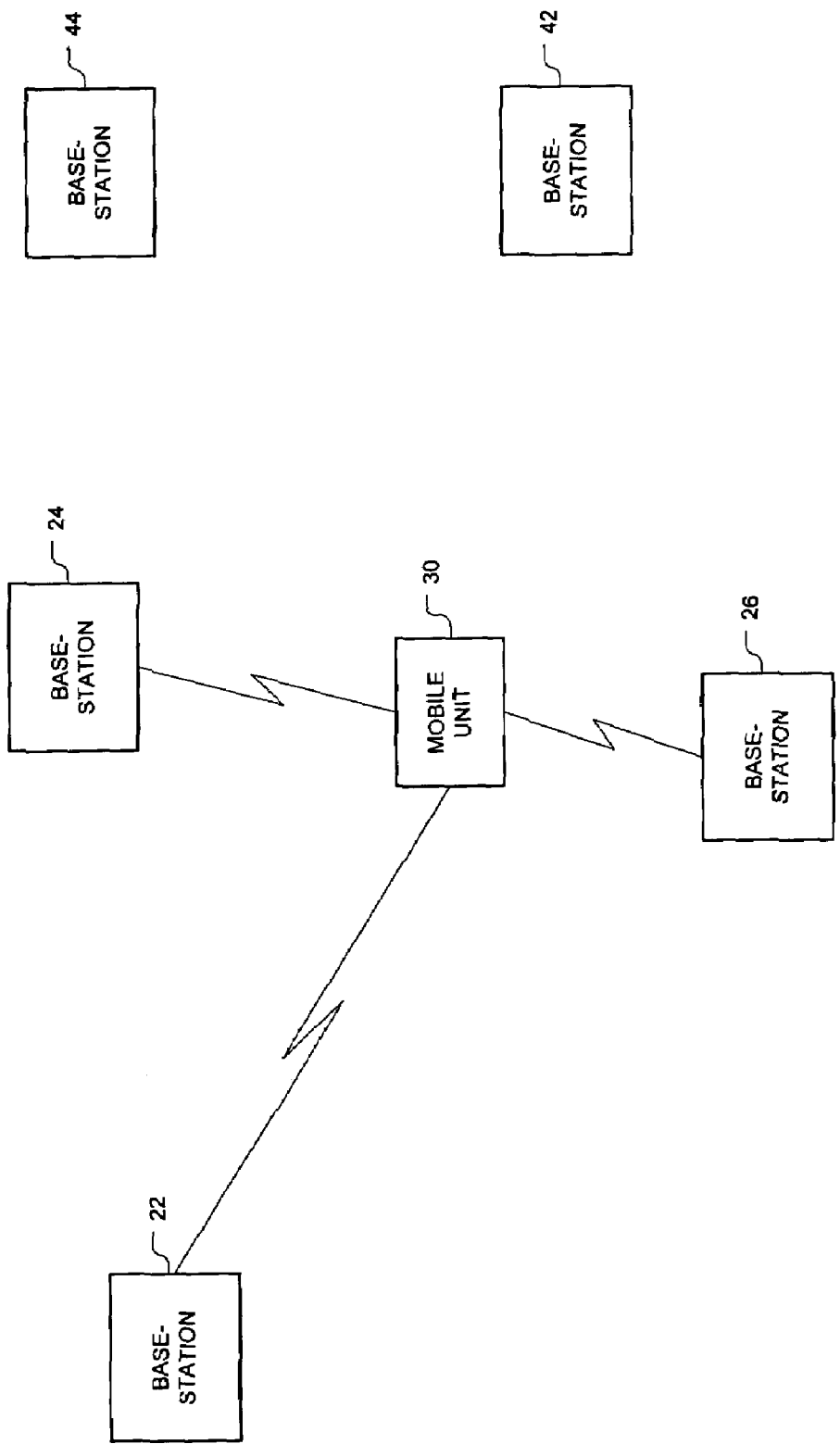
FIG. 1 is a block diagram of a cellular communication system comprising a plurality of base stations that may be used to practice the present invention.

FIG. 1 is a block diagram of a cellular system segment 10 in which the present invention may be employed. In this cellular system segment 10, there are a plurality of base stations 22, 24, 26, 42, and 44 that are geographically separated and a mobile unit 30. The mobile unit may be any wireless apparatus that includes a cellular Modulator/Demodulator ("modem") that may communicate with a base station ("BS") 22, 24, 26, 42, or 46. For example, the mobile unit may be a cellular telephone, personal data assistant ("PDA"), or computer. In one embodiment, each base station may communicate with the mobile unit when the signal strength of the mobile unit, as received at a base station, is sufficiently strong. In one invention embodiment, the base stations support the same wireless communication protocol standard (such as the CDMA IS2000 rev. C standard). In another embodiment of the invention, the base stations may support different or multiple communication protocol standards. In addition, the mobile unit 30 may support a single or multiple communication protocol standards. For example, the device 30 may support a CDMA standard, Advanced Mobile Phone Service ("AMPS") standard, a Time Division Multiple Access ("TDMA") standard, and a Groupe Special Mobile ("GSM") standard. In the example shown in FIG. 1, the mobile unit 30 is capable of communicating with all of the base stations 22, 24, 26, 42, or 44 using a CDMA standard.

In FIG. 1, the mobile unit 30 acquires pilot signals from several base stations 22, 24, and 26. In this example, the pilot signal from the base stations 42 and 44 may be too weak based upon the mobile unit's current location. The mobile unit 30 may determine the channel quality for each base station 22, 24, and 26, with each base station representing a cell in the cellular network segment 10. The channel quality for each cell may vary due to the noise and interference experienced (i.e., "seen") by the mobile unit. In CDMA cellular systems, non-multi-path signals transmitted from the same cell are orthogonal to each other. A mobile unit receiving a pilot signal may remove same cell signals by a despreading process. Consequently, signal interference seen using a mobile unit is commonly caused by other cell signals (between other base stations and other mobile units (not shown in FIG. 1)) and multi-path signals within the same cell. A Rake receiver may be employed to combine multi-path signals in order to generate a single, stronger coherent signal.

Figure 2:
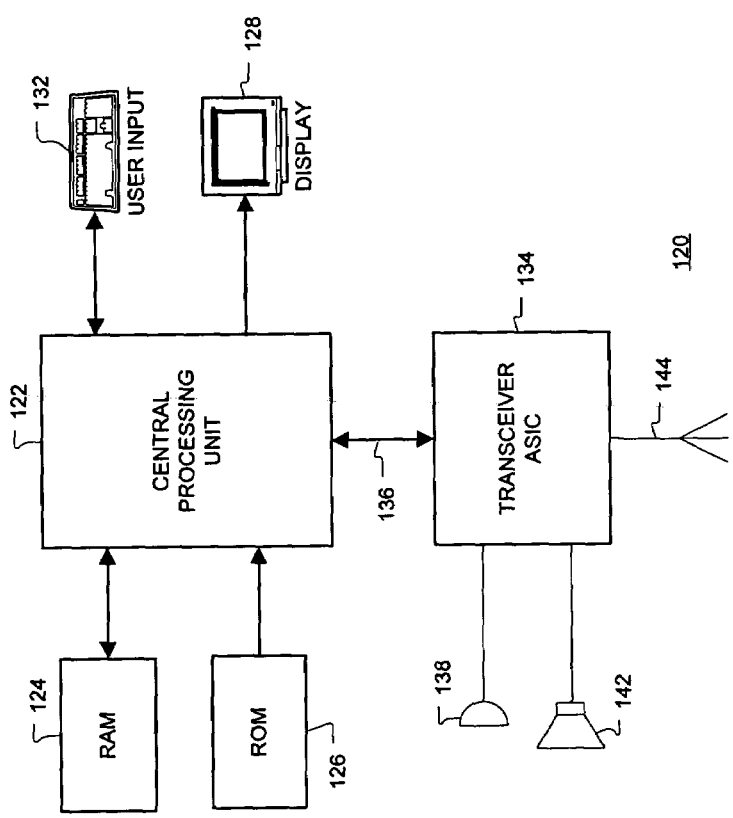
FIG. 2 is a block diagram of an exemplary mobile unit that may be used to practice the present invention.

FIG. 2 is a block diagram of an exemplary mobile unit 120 that may be used to practice the present invention. The exemplary device 120 may include a central processing unit ("CPU") 122, a random access memory ("RAM") 124, a read only memory ("ROM") 126, a display 128, a user input device 132, a transceiver application specific integrated circuit ("ASIC") 134, a microphone 138, a speaker 142, and an antenna 144. The ROM 126 is coupled to the CPU 122 and stores the program instructions executed by the CPU 122. The RAM 124 is coupled to the CPU 122 and stores temporary program data and overhead information. The user-input device 132 may comprise an input device such as a keypad, touch pad screen, track ball or other similar input device that allows the user to navigate through menus in order to place calls, in addition to performing other functions. The display 128 is an output device such as a CRT, LCD or other similar screen display that enables the user to read received data and to place calls.

The microphone 138 and speaker 142 may be incorporated into a handset that is coupled to the ASIC 134. The microphone 138 and speaker 142 may also be separated from the handset to allow hands-free communication. In this mode, the ASIC 134 may include voice activation circuitry that converts voice commands into data. The data is transmitted to the CPU 122 via a serial bus 136 and may include a telephone number to be dialed.

Figure 4B:
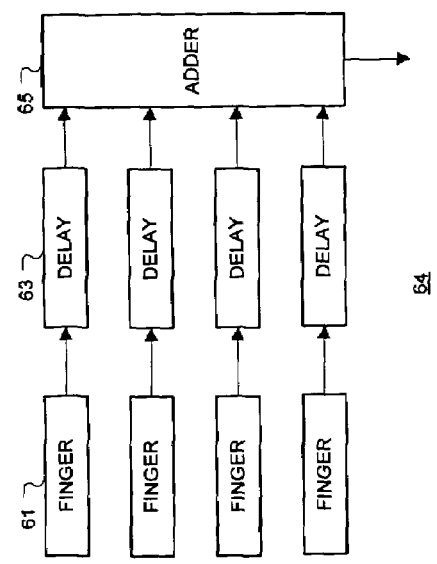
FIG. 4B is a simplified block diagram of an exemplary Rake receiver that may be used to practice the present invention.
Figure 4A:
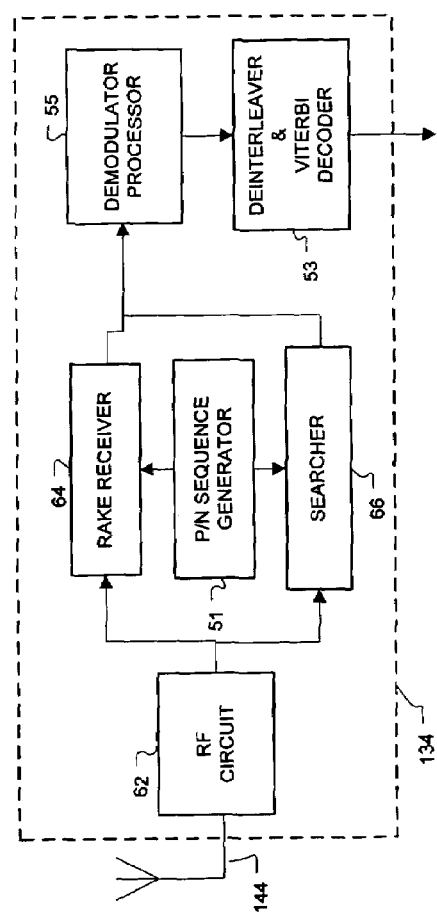
FIG. 4A is a block diagram of an exemplary mobile unit transceiver ASIC segment that may be used to practice the present invention.

The transceiver ASIC 134 includes an instruction set necessary to communicate data and voice signals over the cellular network segment 10. In one embodiment, the transceiver ASIC 134 is a code division multiple access ("CDMA") ASIC and the cellular network is a CDMA network that supports data and voice communication. The ASIC 134 is coupled to the antenna 144 to communicate signals within the cellular network segment 10. When a data signal is received by the transceiver ASIC 134, the data is transferred to the CPU 122 via a serial bus 136. The data can include base station overhead information to be stored by the mobile unit in accordance with the methods described herein. The ASIC 134 may perform operations to determine channel quality. An exemplary portion of the ASIC 134 is shown in FIG. 4A. As shown in FIG. 4A, the exemplary ASIC 134 includes a radio frequency ("RF") circuit 62, a Rake receiver 64, a searcher correlator 66, P/N sequence generator 51, demodulator processor 55, and deinterleaver and Viterbi decoder 53. These components, 51, 53, 55, 62, 64, and 66 for CDMA mobile units are well known to those of skill in the art.

Figure 4C:
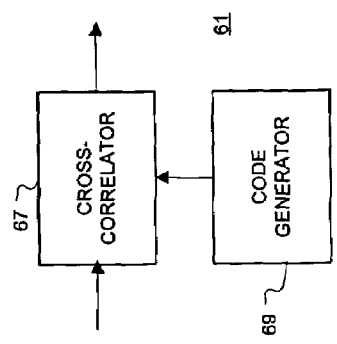
FIG. 4C is a block diagram of an exemplary finger of the Rake receiver of FIG. 4B that may be used to practice the present invention.

The searcher 66 may include one or more correlators. The searcher 66 may be employed to locate target pilot signals of nearby target base stations in an exemplary embodiment. The searcher may also be employed to find the largest multi-path peaks present in a received signal. FIG. 4B is a simplified block diagram of a Rake receiver 64 that may be employed in the present invention. The Rake receiver is used to combine the identified largest multi-path peaks into a single, coherent signal. As shown in this figure, the Rake receiver 64 includes a plurality of fingers 61, a plurality of delay units 63, and an adder 65. FIG. 4C is a simplified block diagram of a finger 61 that may be employed in the present invention. As shown in FIG. 4C, the finger 61 includes a code generator 69 and a cross-correlator 67. The code generator 69 provides the code for the signal to be correlated and the cross-correlator 67 correlates the signal to the selected/generated code, at the offset searched and determined by the searcher. A mobile unit 120 employing a Rake receiver 64 may significantly reduce noise or interference due to signal multi-path interference.

Figure 3:
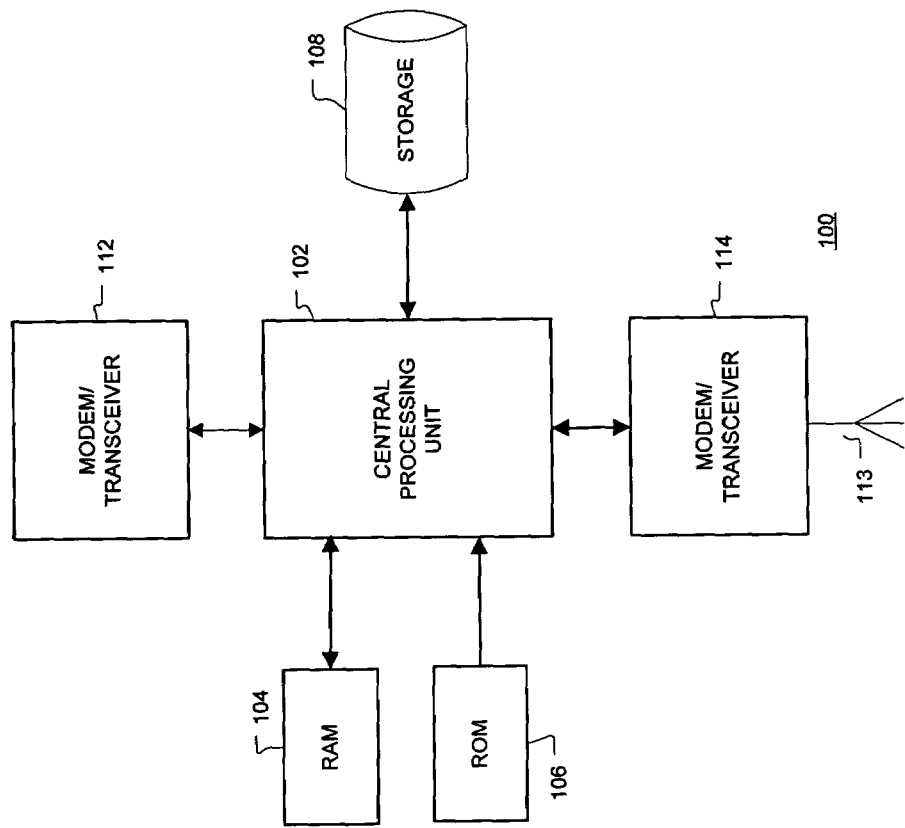
FIG. 3 is a block diagram of an exemplary base station that may be used to practice the present invention.

FIG. 3 illustrates a block diagram of an exemplary base station 100 that may be used in practicing the present invention. The exemplary base station 100 may include a CPU 102, a RAM 104, a ROM 106, a storage unit 108, a first modem/transceiver 112 and a second modem/transceiver 114. The first modem/transceiver 112 may couple, in a well-known manner, the base station 100 to a central cellular network control center via an Internet connection or via a wired telephone system such as the Plain Old Telephone System ("POTS"). The second modem/transceiver 114 couples the base station 100 to the cellular network segment 10. The modem/transceiver 114 may be an Ethernet modem, telephone modem, wireless modem or other communication device that communicates with the cellular network 10 (FIG. 1). The CPU 102 directs communications between the first and second modem, 112 and 114, respectively, for messages between the central network control center, Internet, or POTS, and one or more mobile units.

Figure 5:
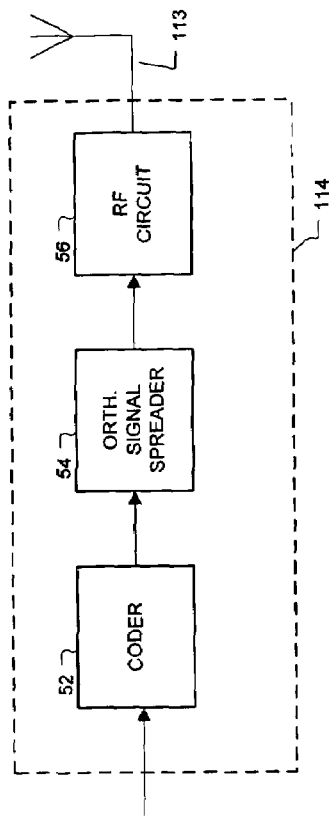
FIG. 5 is a simplified block diagram showing details of the exemplary modem/transceiver of FIG. 3 that may be used to practice the present invention.

The ROM 106 may store program instructions to be executed by the CPU 102. The RAM 104 may be used to store temporary program information and overhead information for other base stations in its sector (i.e., nearby base stations). The storage unit 108 may comprise any convenient form of data storage and may be used to store the overhead information. An exemplary portion of the modem/transceiver 114 is shown in FIG. 5. As shown in FIG. 5, the exemplary modem/transceiver 114 includes a coder 52, an orthogonal signal spreader 54, and an RF circuit 56. In one embodiment the coder 52 applies a unique Pseudo-Random ("P/N") sequence to data to be transmitted. The orthogonal signal spreader 54 applies an orthogonal code to the P/N coded data. In one embodiment, the orthogonal code comprises a Walsh code orthogonal sequence. The RF circuit 56 modulates the orthogonally spread, coded data to a predetermined radio frequency.

In accordance with the CDMA IS2000 standard release C, a mobile unit actively communicating with a base station (active base station) in a CDMA cellular network is required to determine the channel quality of nearby target base stations/cells and to report the determined channel quality to the active base station. The IS2000 standard release C states that the channel quality is equal to a ratio of the pilot energy to the interference density ($N_t$), where $N_t$ is the noise level experienced by the mobile unit when the received signal is despread using a target cell P/N sequence, excluding all same-cell orthogonal signals of the target cell/BS. The active base station may report this information to a system controller (not shown) or it may evaluate the information to determine whether the mobile unit should be transferred to another target base station/cell (i.e., perform a cell switch). Using the Rake receiver 64 (of the ASIC 134), the mobile unit 30 may accurately determine the interference density ($N_t$) for a receive path (pilot signal). Target base station pilot signals, however, are not assigned to a finger 61 of the Rake receiver 64 of the mobile unit 30. The Rake receiver 64 is employed to combine multi-path components of CDMA signals from the mobile unit's currently assigned/active base station (cell).

Figure 6A:
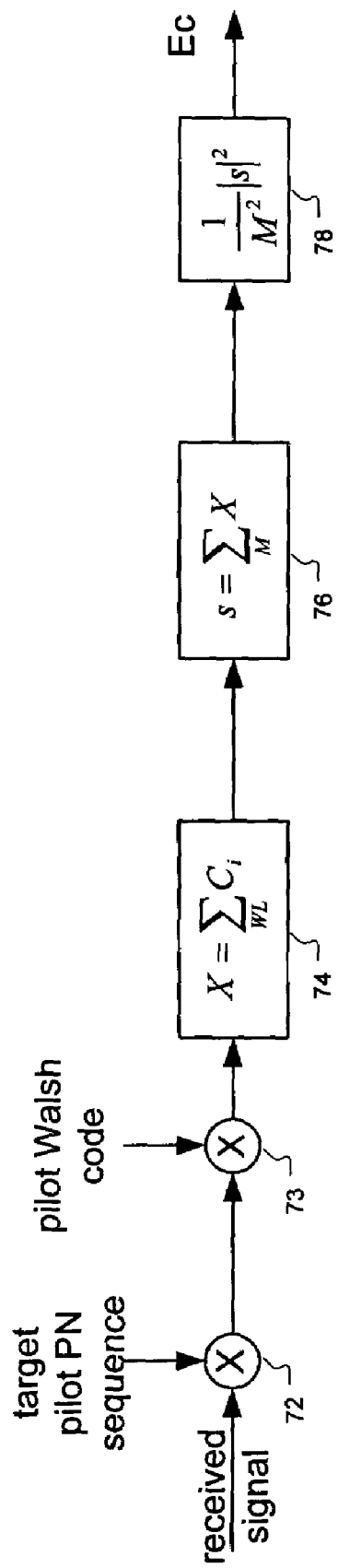
FIG. 6A depicts an exemplary process used to determine the energy of a received pilot signal in accordance with the teachings of the present invention.
Figure 6B:
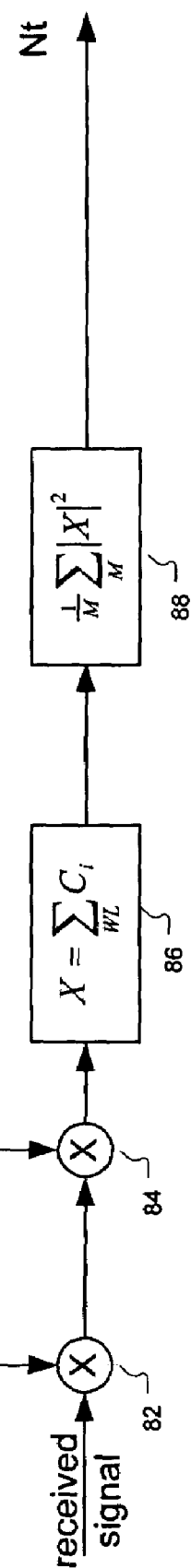
FIG. 6B depicts an exemplary process used to determine the interference density, $N_t$, of a received pilot signal in accordance with the teachings of the present invention.

In one embodiment of the present invention the searcher 66 is engaged to determine the pilot energy Ec and interference density $N_t$ of target base station pilot signals. In particular, the present invention employs the searcher 66 to perform the processes and calculations shown in FIGS. 6A, 6B, and FIG. 8. FIGS. 6A and 6B depict two exemplary correlation processes, 70 and 80, that may be used in combination to determine the value of C/I. FIG. 6A depicts an exemplary process 70 that may be used to determine the energy of a received target pilot signal. FIG. 6B depicts an exemplary process 80 that may be used to determine the interference density, $N_t$, of the received target pilot signal.

In one exemplary embodiment the processes 70 and 80 are sequentially executed by a searcher correlator 66 (FIG. 4A). In this embodiment, at a first time, T1, the searcher correlator 66 performs the first correlation process 70. At a later time T2, the searcher correlator 66 performs the second correlation process 80. In the first correlation process 70, a target pilot P/N sequence is correlated with the received signal (step 72). Next, the pilot Walsh code is correlated with the output signal from correlation step 72 (step 73). The resultant signal component C is then accumulated over a period WL, where WL is equal to an integer multiple of the maximum Walsh code length used by the target cell (step 74). In all current CDMA IS2000 standards, the maximum Walsh code length used in a cell is less than 256. In an exemplary embodiment, in order to increase estimation accuracy, the accumulation (step 74) is performed for several Walsh code windows (step 76), M times, where M is an integer. The received pilot signal power, Ec, is then estimated in step 78 as $$\frac{1}{M^2}|s|^2.$$

At a later time T2, in an exemplary embodiment the searcher correlator 66 is used to perform the search second correlation process 80 shown in FIG. 6B. In process 80, the target pilot P/N sequence is correlated with the received signal (step 82). Next, an orthogonal Walsh code sequence is correlated with the resultant correlated signal (step 84). The signal component C is accumulated over the period WL (step 86). In an exemplary embodiment, in order to increase the estimation accuracy, the accumulation (step 86) is performed for several Walsh code windows (step 88), M times, where M is an integer. The received signal interference density, $N_t$, is estimated at step 88 as $$\frac{1}{M}\sum_M |X|^2.$$

The orthogonal Walsh code used in step 84 ideally is orthogonal to all active Walsh codes in the same cell. Because the Walsh codes used in a base station may change over time, in one exemplary embodiment, a Walsh code is used that is not used for pilot signals, transmission diversity pilot signals, auxiliary pilot signals, or any channel that has a constant bit stream. This code may be determined in an IS2000 standard conforming system because such systems use specific Walsh codes for these types of signals.

In another embodiment, a Quasi Orthogonal code sequence is used as the orthogonal Walsh code in step 84 of process 80. The Quasi Orthogonal code sequence is comprised of a repetition of a code sequence that is orthogonal to other Walsh code sequences currently employed by the target base station. Further, variations of the processes 70 and 80 may be used in other embodiments. In another process, multiple correlations, performed on different input data, may be averaged. This process may reduce the noise estimation $N_t$ variance. In another embodiment, the processes 70 and 80 may remove the correlation values that are too large or too small as compared with the remaining correlation values (i.e., apply a median filter to the correlation values). In any of these processes, the selected orthogonal Walsh code should be aligned with the Walsh code of the received signals in order to achieve desirable correlation performance.

Figure 7A:
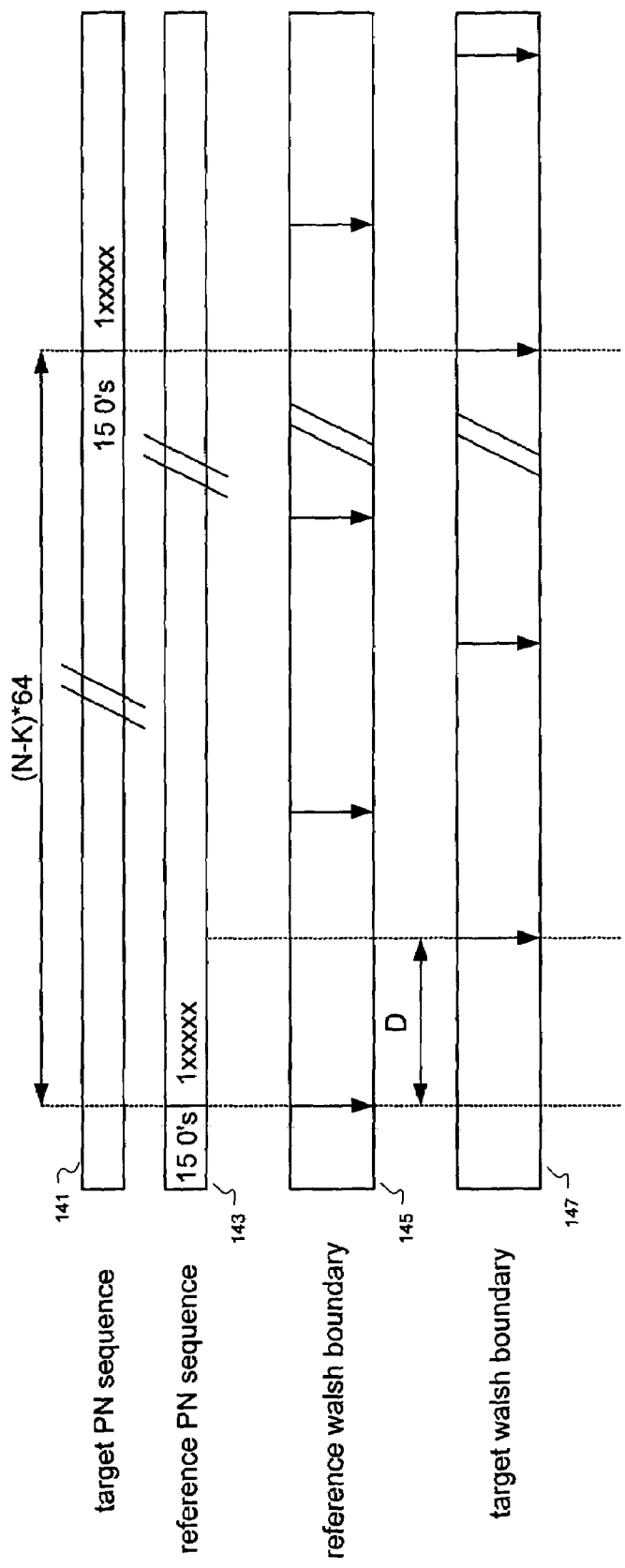
FIG. 7A is a diagram of exemplary sequences and their Walsh boundaries including an offset, D, in a CDMA IS2000 standard-based system that may be used in practicing the present invention.
Figure 7B:
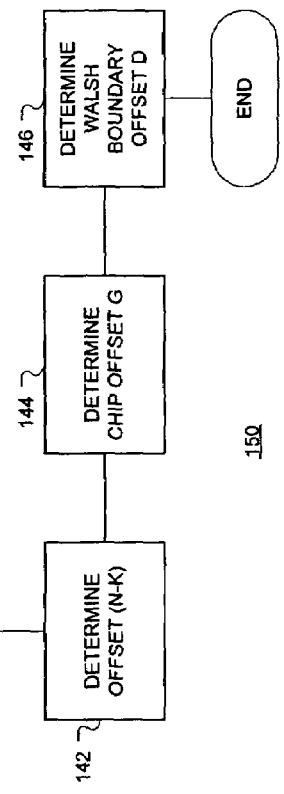
FIG. 7B is a flowchart illustrating a process for determining the target pilot signal Walsh boundary offset, D, in accordance with the teachings of the present invention.

FIG. 7A is a diagram of exemplary sequence and their Walsh boundaries, including an offset, "D", in a CDMA IS2000 standard-based system. FIG. 7B is a flowchart, illustrating a process 150, for determining the target pilot signal Walsh boundary offset D, which is the target Walsh boundary offset from the active cell, reference Walsh boundary. Since the active cell reference Walsh boundary is known to the searcher, determining D provides the target cell Walsh boundary. In step 142 of process 150, the offset between a target P/N sequence and a reference P/N sequence is determined. In a CDMA IS2000 standard-based system, target sequences are offset by increments of 64 chips. Further, the mobile unit's base station provides the differential offset (N−K) between its reference pilot P/N sequence 143 and a target pilot P/N sequence 141. The target sequence 141 and reference sequence 143 may have different signal propagation times (between their respective base station and the mobile unit). Step 144 of process 150 determines the chip offset, G, representing the signal propagation differential between the target pilot P/N sequence 141 and the reference P/N sequence 143.

In one embodiment, the correlation peak of the received target sequence is used to determine the value G based on a known reference within a P/N sequence, e.g. the first logical 1 following 15 logical 0's. The Walsh boundary is obtained from a known reference boundary as follows. In process 150, D is determined based on the offset "G" and "N−K". In particular, D=((N−K)*64+G)mod Walsh_Length, where the value of Walsh_Length comprises the length of the Walsh code that is to be correlated with the target pilot signal to obtain noise level estimation (step 146).

Figure 8:
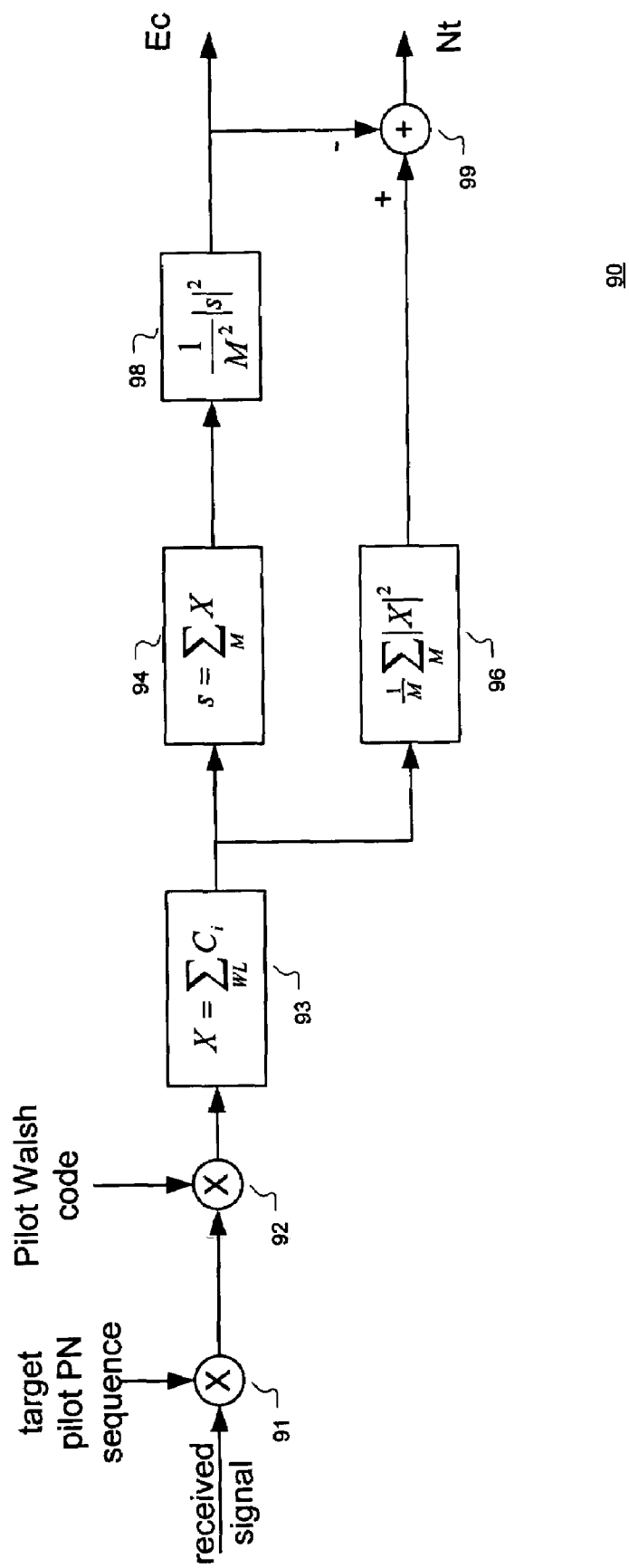
FIG. 8 depicts another exemplary process of determining the value of C/I of a received pilot signal in accordance with the teachings of the present invention.

FIG. 8 depicts another exemplary process 90 that may be used to determine the value of C/I. In process 90, as shown in FIG. 8, the target pilot P/N sequence is correlated with the received pilot signal (step 91). The pilot Walsh code is then correlated with the thus correlated received signal (step 92). The resultant signal component C is accumulated over a period WL, where WL is equal to the maximum Walsh code length used by the pilot signal's cell (step 93). In an exemplary embodiment, in order to increase estimation accuracy, the accumulation (step 93) is performed for several Walsh code windows (step 94), M times, where M is an integer. The total signal power is estimated at step 96 as $$\frac{1}{M}\sum_M |x|^2.$$

At a step 98, the received pilot signal power, Ec, is estimated as $$\frac{1}{M^2}|s|^2.$$

The received pilot signal interference density, $N_t$, is estimated as differential between the total signal power and the received pilot signal power, Ec (at step 99). Because the power estimation is summed over integer multiples of Walsh length, the correlation is ideally aligned with Walsh boundary as determined by the process 150 of FIG. 7B described above in more detail.

The previous description of the preferred embodiments is provided to enable any person skilled in the wireless communications art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

While this invention has been described in terms of a best mode for achieving this invention's objectives, it will be appreciated by those skilled in the wireless communications art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code on a network for remote execution.

What is claimed is:

1. A system for communicating data signals using a spread spectrum cellular network, comprising:
 a plurality of base stations coupled to the cellular network, each base station of the plurality of base stations including means for transmitting a pilot signal sequence; and
 a mobile unit coupled to the cellular network and assigned to an active base station that is one of the plurality of base stations, the mobile unit including:
  a) means for receiving a signal of a target base station that is another of the plurality of base stations; and
  b) means for determining an interference density to the target base station from the received signal including:
   i) means for selecting a code sequence that is at least quasi-orthogonal to all Orthogonal code sequences currently employed by the target base station,
   ii) means for synchronizing the selected code sequence with an Orthogonal code sequence boundary of the target base station's pilot sequence,
   iii) means for correlating the received signal with a corresponding P/N sequence of the target base station and also with the selected code sequence, and
   iv) means for determining an energy of the P/N correlated, selected code correlated received signal.

2. The system of claim 1, wherein the selected code sequence is a Walsh code sequence.

3. The system of claim 2, wherein the cellular network is a CDMA based network and each base station of the plurality of base stations represents a network cell.

4. The system of claim 3, wherein the selected code sequence is comprised of a repetition of a code sequence that is orthogonal to other code sequences currently employed by the target base station and the length of the selected code is an integer multiple of the longest Orthogonal code sequences currently employed by the target base station.

5. The system of claim 1, wherein the means for synchronizing the selected code sequence includes:
 A. means for determining an Orthogonal code sequence boundary for the active base station's pilot signal; and
 B. means for determining the Orthogonal code sequence boundary for the target base station's pilot signal from the determined active base station's pilot signal Orthogonal code sequence boundary.

6. The system of claim 3, the mobile unit further comprising means for determining a power of the received target base station's pilot signal sequence.

7. The system of claim 6, the mobile unit further comprising means for providing a ratio of the determined target base station's pilot signal power and interference density to the active base station.

8. The system of claim 1, wherein the means for determining the interference density includes:
   means for correlating the received signal with a corresponding P/N sequence of the target base station;
   means for correlating a pilot Orthogonal code sequence with the target base station's P/N correlated signal; and
   means for determining a power of the target base station's P/N correlated signal.

9. The system of claim 8, wherein the pilot Orthogonal code sequence is a Walsh code sequence.

10. The system of claim 9, wherein the cellular network is a CDMA based network and each base station of the plurality of base stations represents a network cell.

11. The system of claim 9, wherein the means for synchronizing the pilot Orthogonal code sequence includes:
   A. means for determining an Orthogonal code sequence boundary for the active base station's pilot signal; and
   B. means for determining the Orthogonal code sequence boundary for the target base station's pilot signal from the determined active base station's pilot signal Orthogonal code sequence boundary.

12. The system of claim 11, the mobile unit further comprising means for providing a ratio of the determined target base station's pilot signal power and interference density to the active base station.

13. A mobile unit for communicating data signals using a spread spectrum cellular network, the cellular network including a plurality of base stations coupled to the cellular network and the mobile unit being assigned to an active base station that is one of the plurality of base stations, the mobile unit comprising:
   a) means for receiving a signal of a target base station that is another of the plurality of base stations; and
   b) means for determining an interference density to the target base station from the received signal including:
      i) means for selecting a code sequence that is at least quasi-orthogonal to all Orthogonal code sequences currently employed by the target base station,
      ii) means for synchronizing the selected code sequence with an Orthogonal code sequence boundary of the target base station's pilot sequence,
      iii) means for correlating the received signal with a corresponding P/N sequence of the target base station and also with the selected code sequence, and
      iv) means for determining an energy of the P/N correlated, selected code correlated received signal.

14. The mobile unit of claim 13, wherein the selected code sequence is a Walsh code sequence.

15. The mobile unit of claim 14, wherein the cellular network is a CDMA based network and each base station of the plurality of base stations represents a network cell.

16. The mobile unit of claim 15, wherein the selected code sequence is comprised of a repetition of a code sequence that is orthogonal to other code sequences currently employed by the target base station and the length of the selected code is an integer multiple of the longest Orthogonal code sequences currently employed by the target base station.

17. The mobile unit of claim 13, wherein the means for synchronizing the Orthogonal code sequence includes:
   A. means for determining an Orthogonal code sequence boundary for the active base station's pilot signal; and
   B. means for determining the Orthogonal code sequence boundary for the target base station's pilot signal from the determined active base station's pilot signal Orthogonal code sequence boundary.

18. The mobile unit of claim 15, further comprising means for determining a power of the received target base station's pilot signal sequence.

19. The mobile unit of claim 18, the mobile unit further comprising means for providing a ratio of the determined target base station's pilot signal power and interference density to the active base station.

20. The mobile unit of claim 13, wherein the means for determining the interference density includes:
   means for correlating the received signal with a corresponding P/N sequence of the target base station;
   means for correlating a pilot Orthogonal code sequence with the target base station's P/N correlated signal; and
   means for determining a power of the target base station's P/N correlated signal.

21. The mobile unit of claim 20, wherein the pilot Orthogonal code sequence is a Walsh code sequence.

22. The mobile unit of claim 21, wherein the cellular network is a CDMA based network and each base station of the plurality of base stations represents a network cell.

23. The mobile unit of claim 22, wherein the means for synchronizing the pilot Orthogonal code sequence includes:
   A. means for determining an Orthogonal code sequence boundary for the active base station's pilot signal; and
   B. means for determining the Orthogonal code sequence boundary for the target base station's pilot signal from the determined active base station's pilot signal Orthogonal code sequence boundary.

24. The mobile unit of claim 23, the mobile unit further comprising means for providing a ratio of the determined target base station's pilot signal power and interference density to the active base station.

25. A method of communicating data signals using a spread spectrum cellular network, the cellular network including a plurality of base stations coupled to the cellular network and a mobile unit that is assigned to an active base station that is one of the plurality of base stations, the method comprising the steps of:
   a) receiving a signal of a target base station that is another of the plurality of base stations; and
   b) determining the interference density to the target base station from the received signal including the steps of:
      i) selecting a code sequence that is at least quasi-orthogonal to all Orthogonal code sequences currently employed by the target base station,
      ii) synchronizing the selected code sequence with an Orthogonal code sequence boundary of the target base station's pilot sequence,
      iii) correlating the received signal with a corresponding P/N sequence of the target base station and also with the selected code sequence, and
      iv) determining an energy of the target P/N correlated, selected code correlated received signal.

26. The method of claim 25, wherein the selected code sequence is a Walsh code sequence.

27. The method of claim 26, wherein the cellular network is a CDMA based network and each base station of the plurality of base stations represents a network cell.

28. The method of claim 27, wherein the selected code sequence is comprised of a repetition of a code sequence that is orthogonal to other code sequences currently employed by the target base station and the length of the selected code is an integer multiple of the longest Orthogonal code sequences currently employed by the target base station.

29. The method of claim 25, wherein the step of synchronizing the selected code sequence includes the steps of:
- A. determining an Orthogonal code sequence boundary for the active base station's pilot signal; and
- B. determining the Orthogonal code sequence boundary for the target base station's pilot signal from the determined active base station's pilot signal Orthogonal code sequence boundary.

30. The method of claim 27, further comprising the step of determining a power of the received target base station's pilot signal sequence.

31. The method of claim 30, further comprising the step of providing a ratio of the determined target base station's pilot signal power and interference density to the active base station.

32. The method of claim 25, wherein the step of determining the interference density includes the steps of:
- correlating the received signal with a corresponding P/N sequence of the target base station;
- correlating a pilot Orthogonal code sequence with the target base station's P/N correlated signal; and
- determining a power of the target base station's P/N correlated signal.

33. The method of claim 32, wherein the pilot Orthogonal code sequence is a Walsh code sequence.

34. The method of claim 33, wherein the cellular network is a CDMA based network and each base station of the plurality of base stations represents a network cell.

35. The method of claim 34, wherein the step of synchronizing the pilot Orthogonal code sequence includes the steps of:
- A. determining an Orthogonal code sequence boundary for the active base station's pilot signal; and
- B. determining the Orthogonal code sequence boundary for the target base station's pilot signal from the determined active base station's pilot signal Orthogonal code sequence boundary.

36. The method of claim 35, further comprising the step of providing a ratio of the determined target base station's pilot signal power and interference density to the active base station.

37. An article of manufacture for use in a mobile unit communicating data signals using a spread spectrum cellular network, the cellular network including a plurality of base stations coupled to the cellular network and the mobile unit being assigned to an active base station that is one of the plurality of base stations, the article of manufacture comprising computer readable storage media including program logic embedded therein that causes control circuitry to perform the steps of:
- a) receiving a signal of a target base station that is another of the plurality of base stations; and
- b) determining an interference density to the target base station from the received signal including the steps of:
  - i) selecting a code sequence that is at least quasi-orthogonal to all Orthogonal code sequences currently employed by the target base station,
  - ii) synchronizing the selected code sequence with an Orthogonal code sequence boundary of the target base station's pilot sequence,
  - iii) correlating the received signal with a corresponding P/N sequence of the target base station and also with the selected code sequence, and
  - iv) determining an energy of the P/N correlated, selected code correlated received signal.

38. The article of manufacture of claim 37, wherein the selected code sequence is a Walsh code sequence.

39. The article of manufacture of claim 38, wherein the cellular network is a CDMA based network and each base station of the plurality of base stations represents a network cell.

40. The article of manufacture of claim 39, wherein the selected code sequence is comprised of a repetition of a code sequence that is orthogonal to other code sequences currently employed by the target base station and the length of the selected code is an integer multiple of the longest Orthogonal code sequences currently employed by the target base station.

41. The article of manufacture of claim 37, wherein the step of synchronizing the selected code sequence includes the steps of:
- A. determining an Orthogonal code sequence boundary for the active base station's pilot signal; and
- B. determining the Orthogonal code sequence boundary for the target base station's pilot signal from the determined active base station's pilot signal Orthogonal code sequence boundary.

42. The article of manufacture of claim 39, the steps performed by the control circuitry under control of the embedded program logic further comprising the step of determining a power of the received target base station's pilot signal sequence.

43. The article of manufacture of claim 42, the steps performed by the control circuitry under control of the embedded program logic further comprising the step of providing a ratio of the determined target base station's pilot signal power and interference density to the active base station.

44. The article of manufacture of claim 37, wherein the step of determining the interference density includes the steps of:
- correlating the received signal with a corresponding P/N sequence of the target base station;
- correlating a pilot Orthogonal code sequence with the target base station's P/N correlated signal; and
- determining a power of the target base station's P/N correlated signal.

45. The article of manufacture of claim 44, wherein the pilot Orthogonal code sequence is a Walsh code sequence.

46. The article of manufacture of claim 45, wherein the cellular network is a CDMA based network and each base station of the plurality of base stations represents a network cell.

47. The article of manufacture of claim 46, wherein the step of synchronizing the pilot Orthogonal code sequence includes the steps of:
- A. determining an Orthogonal code sequence boundary for the active base station's pilot signal; and
- B. determining the Orthogonal code sequence boundary for the target base station's pilot signal from the determined active base station's pilot signal Orthogonal code sequence boundary.

48. The article of manufacture of claim 47, further comprising the step of providing a ratio of the determined target base station's pilot signal power and interference density to the active base station.

* * * * *

UNITED STATES PATENT AND TRADEMARK OFFICE
CERTIFICATE OF CORRECTION

```
PATENT NO.       : 7,450,556 B2                                            Page 1 of 1
APPLICATION NO.  : 10/618079
DATED            : November 11, 2008
INVENTOR(S)      : Shen et al.
```

It is certified that error appears in the above-identified patent and that said Letters Patent is hereby corrected as shown below:

Claim 11, Column 9, line 18, "claim 9" should read --claim 10--.

Claim 25, Column 10, line 55, "target" should be omitted.

Signed and Sealed this

Fourteenth Day of April, 2009

JOHN DOLL
*Acting Director of the United States Patent and Trademark Office*